(12) United States Patent
Tseng et al.

(10) Patent No.: US 8,541,973 B2
(45) Date of Patent: Sep. 24, 2013

(54) SINGLE STAGE LOW BOOST/BUCK RATIO STAND-ALONE SOLAR ENERGY POWER GENERATING CIRCUIT AND SYSTEM THEREOF

(75) Inventors: Sheng-Yu Tseng, Guishan Township (TW); Ying-Jhih Wu, Guishan Township (TW); Kuo-Chi Lin, Hsinchu (TW)

(73) Assignee: Richtek Technology Corp., Chupei (TW)

( * ) Notice: Subject to any disclaimer, the term of this patent is extended or adjusted under 35 U.S.C. 154(b) by 452 days.

(21) Appl. No.: 12/623,433

(22) Filed: Nov. 22, 2009

(65) Prior Publication Data
US 2011/0012551 A1 Jan. 20, 2011

(30) Foreign Application Priority Data
Jul. 15, 2009 (TW) .............................. 98124012 A

(51) Int. Cl.
*H01M 10/46* (2006.01)
(52) U.S. Cl.
USPC .......................................................... 320/101

(58) Field of Classification Search
USPC .................. 320/101, 103, 107, 128, 135, 137, 320/140
See application file for complete search history.

(56) References Cited

U.S. PATENT DOCUMENTS

| | | | |
|---|---|---|---|
| 6,259,235 B1 * | 7/2001 | Fraidlin et al. ................ | 323/222 |
| 6,509,712 B1 * | 1/2003 | Landis ........................... | 320/101 |
| 6,856,654 B1 * | 2/2005 | Carkner et al. ............... | 375/295 |
| 7,465,507 B2 * | 12/2008 | DeVries ......................... | 429/404 |
| 2006/0187689 A1 * | 8/2006 | Hartular ......................... | 363/63 |
| 2010/0102773 A1 * | 4/2010 | Lipcsei .......................... | 320/101 |

* cited by examiner

*Primary Examiner* — Edward Tso

(57) ABSTRACT

A single stage low boost/buck ratio stand-alone solar energy power generating circuit with a system thereof is a simplification of a two-stage type circuit. The two-stage circuit, which has a storage unit, a charging converter circuit for charging the storage unit, and a discharging converter circuit for discharging the stored power to a load, is analyzed and categorized such that a circuit structure is selected via a suitable simplified combination to commonly use the elements constituting the charging and the discharging converter circuits so as to form the single stage circuit with less elements, volume and weight for reducing the production cost of the circuit.

6 Claims, 16 Drawing Sheets

SINGLE STAGE LOW BOOST/BUCK RATIO STAND-ALONE SOLAR ENERGY POWER GENERATING CIRCUIT AND SYSTEM THEREOF

BACKGROUND OF THE INVENTION

1. Field of the Invention

The present invention is related to a stand-alone solar energy power generating system, and particularly to a single stage low boost/buck ratio stand-alone solar energy power generating circuit and a system thereof.

2. Brief Description of the Related Art

The typical application of the stand-alone solar energy power generating system is to supply the power for the lighting system. Usually, the energy storage unit, i.e., the battery, stores the solar energy power generated by the power generating unit at the daytime, and the stored solar energy power is supplied to the load unit such as the illumination equipment. Therefore, the typical solar energy power generating system generally includes two-stage converter circuits, a charging converter and a discharging converter.

FIGS. 1 and 2 show the two-stage low boost/buck ratio stand-alone solar energy power generating system in which the Buck converter 11 and the synchronous rectifying Buck converter 21 act as the charging converter circuit, and the Boost converter 12 and the synchronous rectifying Boost converter 22 act as the discharging converter circuit. It can be seen in FIGS. 1 and 2 that the conventional two-stage circuit structure needs many switches and passive elements such that it is incapable of reducing the volume, weight and size thereof. Furthermore, the complication of driving circuit for the respective switch thereof significantly affect the stability of the circuit and it increases the production cost of the circuit.

SUMMARY OF THE INVENTION

Accordingly, an object of the present invention is to provide a single stage low boost/buck ratio stand-alone solar energy power generating circuit and system which is a simplification of the circuit structure of the conventional two-stage type stand-alone solar energy power generating system. The two-stage circuit is simplified as the single stage circuit with less elements, volume and weight for reducing the production cost of the circuit.

In order to achieve the preceding object, a single stage low boost/buck ratio stand-alone solar energy power generating circuit and system according to the present invention is capable of storing the power generated by the solar energy power generating unit and supplying the stored power to a load unit, and comprises a storage unit, a charging converter circuit for storing the power generated from the solar energy power generating unit in said storage unit, and a discharging converter circuit for supplying the power stored in the storage unit to the load unit; wherein, a plurality of elements are provided by the charging converter circuit and the discharging converter circuit, and part of said elements are commonly used elements.

In the preferred embodiment of a single stage low boost/buck ratio stand-alone solar energy power generating circuit according to the present invention, the charging converter and the discharging converter thereof are constituted by the commonly used elements of the synchronous rectifying Buck-Boost converter.

In the preferred embodiment of a single stage low boost/buck ratio stand-alone solar energy power generating circuit according to the present invention, the charging converter and the discharging converter are constituted by the commonly used elements of the synchronous rectifying Zeta converter and the synchronous rectifying Sepic converter.

In the preferred embodiment of a single stage low boost/buck ratio stand-alone solar energy power generating circuit according to the present invention, the charging converter and the discharging converter are constituted by the commonly used elements of the synchronous rectifying Buck converter and the synchronous rectifying Boost converter.

In the preferred embodiment of a single stage low boost/buck ratio stand-alone solar energy power generating circuit according to the present invention, the energy storage unit thereof is a battery.

In the preferred embodiment of a single stage low boost/buck ratio stand-alone solar energy power generating system according to the present invention, the load unit thereof includes a load and a switch serially connecting with the load.

As the foregoing, a single stage low boost/buck ratio stand-alone solar energy power generating circuit and system according to the present invention is a simplification of the circuit structure of the conventional two-stage type stand-alone solar energy power generating system. The two-stage circuit is simplified as the single stage circuit with less elements, volume and weight for reducing the production cost of the circuit.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
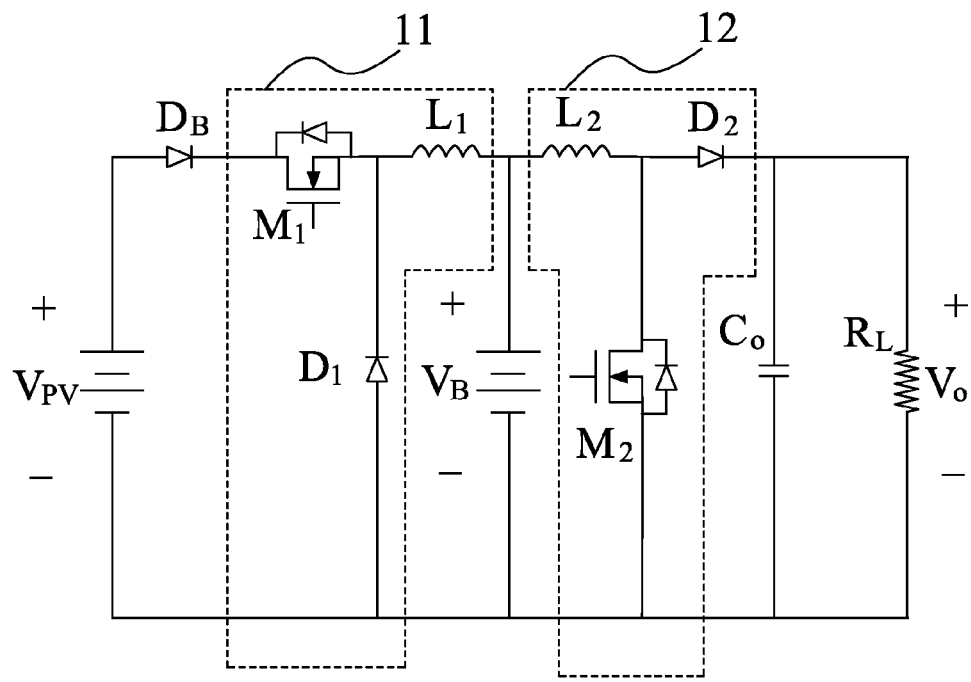
FIG. 1 is a circuit diagram illustrating the conventional two-stage low boost-buck ratio stand-alone solar energy power generating system.
Figure 2:
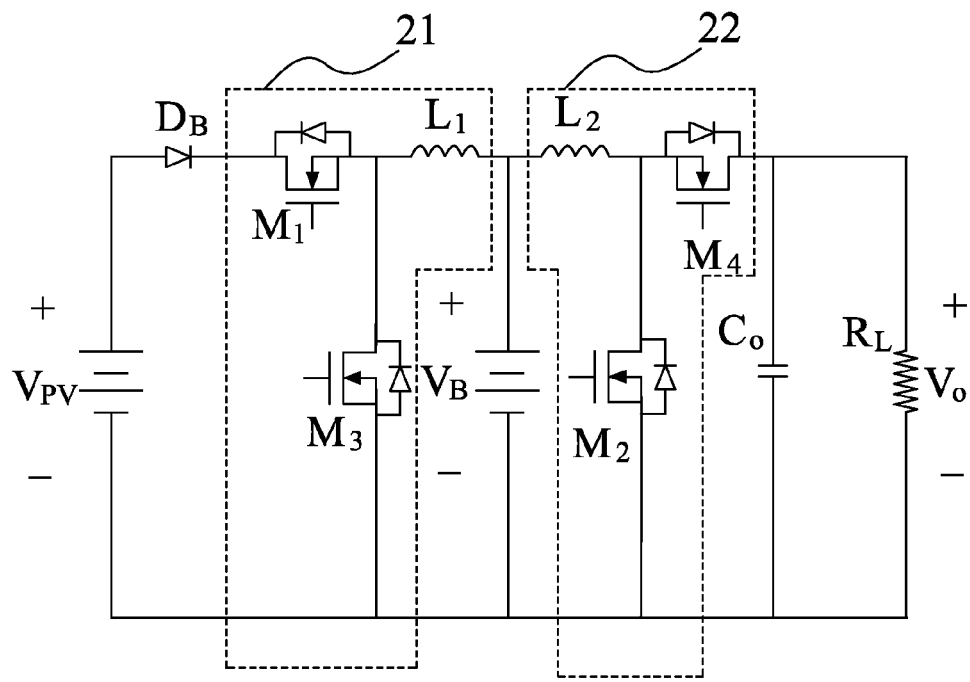
FIG. 2 is a circuit diagram illustrating another two-stage low boost-buck ratio stand-alone solar energy power generating system.
Figure 3:
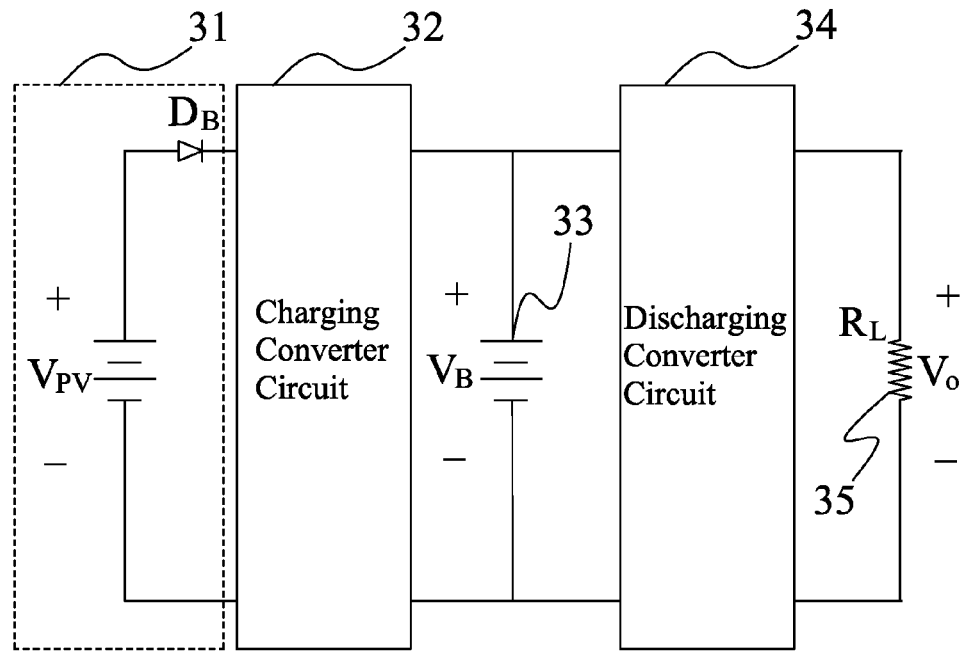
FIG. 3 is a circuit-block diagram illustrating the two-stage low boost-buck ratio stand-alone solar energy power generating system.

Referring to FIG. 3, the conventional two-stage stand-alone solar energy power generating system normally receives the power produced by the solar energy power generating unit such as the solar energy photovoltaic cell 31 at the daytime, and the produced power is stored in an energy storage unit such as the battery 33 by means of the charging converter circuit 32 such that the stored power can be supplied to a load unit 35 by means of the discharging converter circuit 34.

Wherein, selection for the charging converter circuit 32 and the discharging converter circuit 34 is according to relations of the increases and decreases of the voltages such as the output voltage $V_{PV}$ of the solar energy photo voltaic cell 31, the voltage $V_B$ of the battery 33 and the demand voltage $V_O$ of the load unit 35. Generally, it can be selected from the six basic non-isolation converters, the Buck, Boost, Buck-Boost, Cuk, Zeta, and Sepic converters as shown in FIGS. 4A to 4F to perform the function of increasing or decreasing the voltage. According to different voltage conditions of the output voltage $V_{PV}$ of the solar energy photo voltaic cell 31, the voltage $V_B$ of the battery 33 and the demand voltage $V_O$ of the load unit 35, the available selected circuit structure combinations are listed in the following table 1:

TABLE 1

| selectable circuit structure combinations | | |
|---|---|---|
| Voltage conditions | Charging converter circuit | Discharging converter circuit |
| $V_{PV} > V_B$<br>$V_B > V_o$ | Buck, Buck-boost, Cuk, Zeta, Sepic | Buck, Buck-boost, Cuk, Zeta, Sepic |
| $V_{PV} > V_B$<br>$V_B < V_o$ | Buck, Buck-boost, Cuk, Zeta, Sepic | Boost, Buck-boost, Cuk, Zeta, Sepic |
| $V_{PV} < V_B$<br>$V_B > V_o$ | Boost, Buck-boost, Cuk, Zeta, Sepic | Buck, Buck-boost, Cuk, Zeta, Sepic |
| $V_{PV} < V_B$<br>$V_B < V_o$ | Boost, Buck-boost, Cuk, Zeta, Sepic | Boost, Buck-boost, Cuk, Zeta, Sepic |

The six basic non-isolation converters, the Buck, Boost, Buck-Boost, Cuk, Zeta, and Sepic converters, shown in FIGS. 4A to 4F can be further divided into input units 41A, 41B, 41C, 41D, 41E, 41F, energy buffer units 42C, 42D, 42E, 42F, and output units 43A, 43B, 43C, 43D, 43E, 43F. When the respective input unit 41A, 41B, 41C, 41D, 41E, 41F is a switch serially connecting with the voltage source, it is categorized as the voltage type input unit as shown in FIGS. 5A; when it is a switch parallelly connecting with the current source, it is categorized as the current type input unit as shown in FIG. 5B.

Figure 6A:
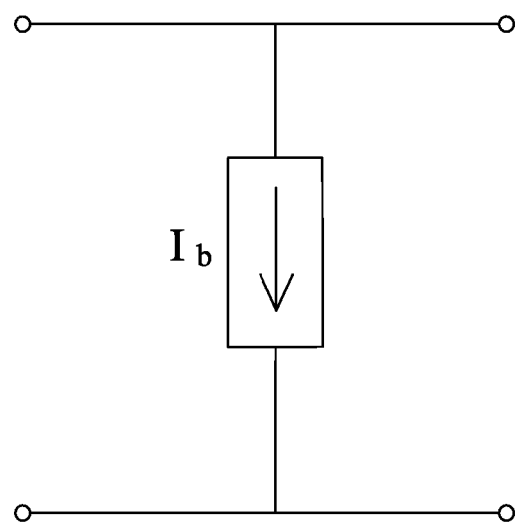
FIG. 6A is a circuit diagram illustrating a current type buffer element of the basic converter.
Figure 6B:
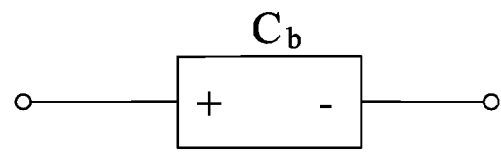
FIG. 6B is a circuit diagram illustrating a voltage type buffer element of the basic converter.
Figure 6B:
Figure 7A:
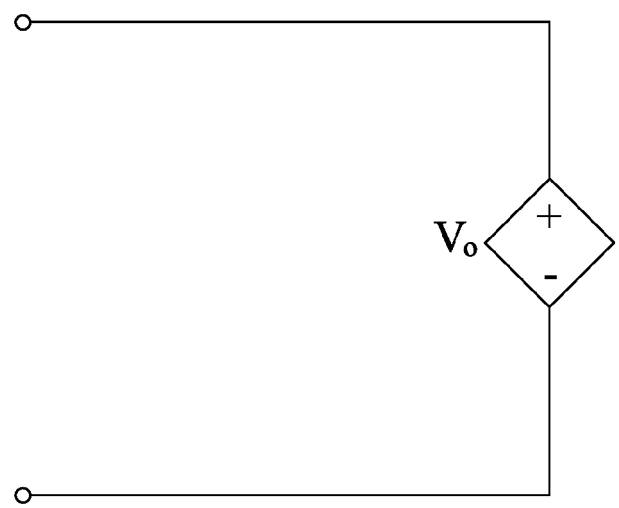
FIG. 7A is a circuit diagram illustrating a voltage type output unit of the basic converter.
Figure 7B:
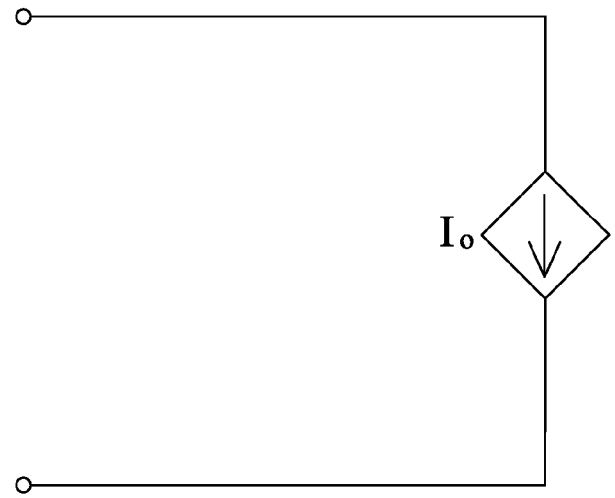
FIG. 7B is a circuit diagram illustrating a current type output unit of the basic converter.

The inductor or capacitor acts as the energy buffer unit 42C, 42D 42E, 42F employed in the converter. The inductor is capable of obstructing the direct current and the capacitance is capable of obstructing the direct voltage such that the inductor can be categorized as the current type buffer element as shown in FIG. 6A, and the capacitor can be categorized as the voltage type buffer element as shown in FIG. 6B. Besides, when the output unit 43A, 43B, 43C, 43D, 43E, 43F is constituted with the capacitor parallelly connecting with the load resistor, the circuit can be categorized as the voltage type output unit as shown in FIG. 7A; when it is constituted with the capacitor parallelly connecting with the load resistor and then serially connecting with the inductor, the circuit can be categorized as the current type output unit as shown in FIG. 7B.

Figure 8A:
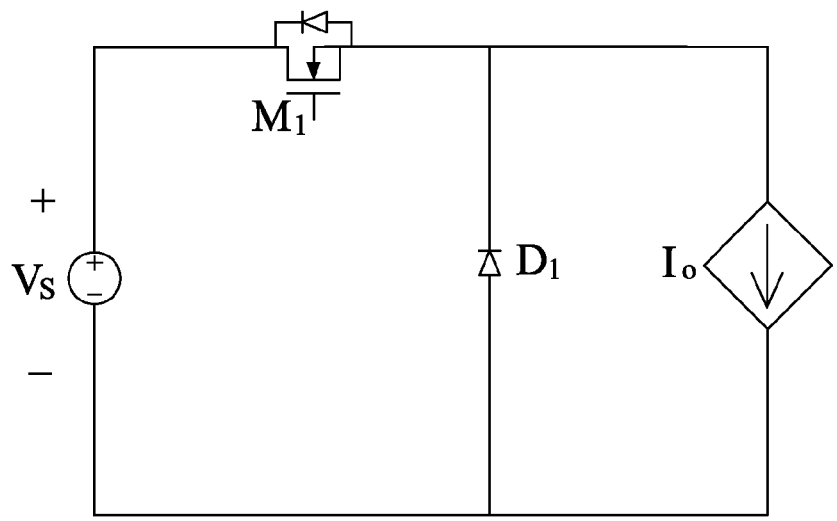
FIG. 8A is a circuit diagram equivalent to the Buck converter shown in FIG. 4A.
Figure 8B:
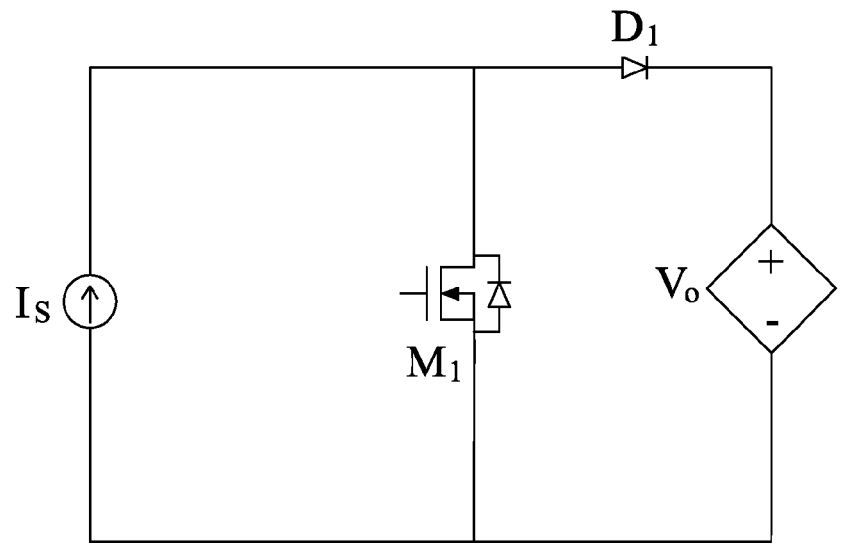
FIG. 8B is a circuit diagram equivalent to the Boost converter shown in FIG. 4B.
Figure 8C:
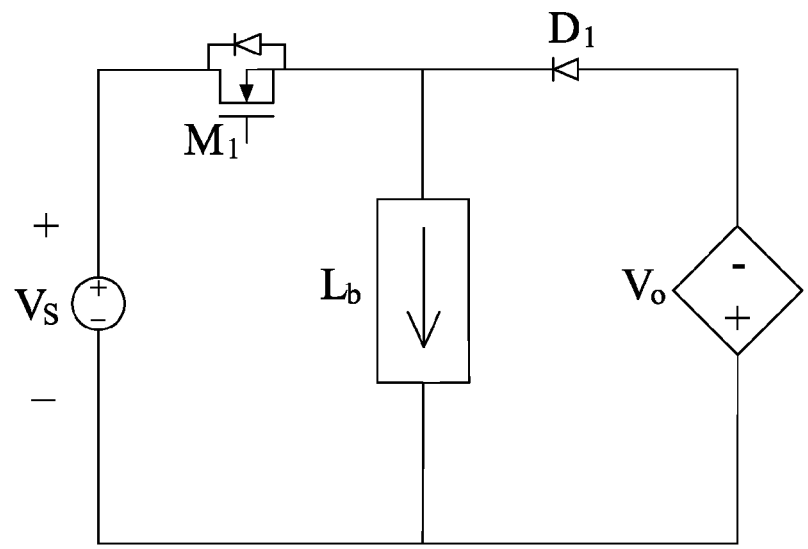
FIG. 8C is a circuit diagram equivalent to the Buck-boost converter shown in FIG. 4C.
Figure 8D:
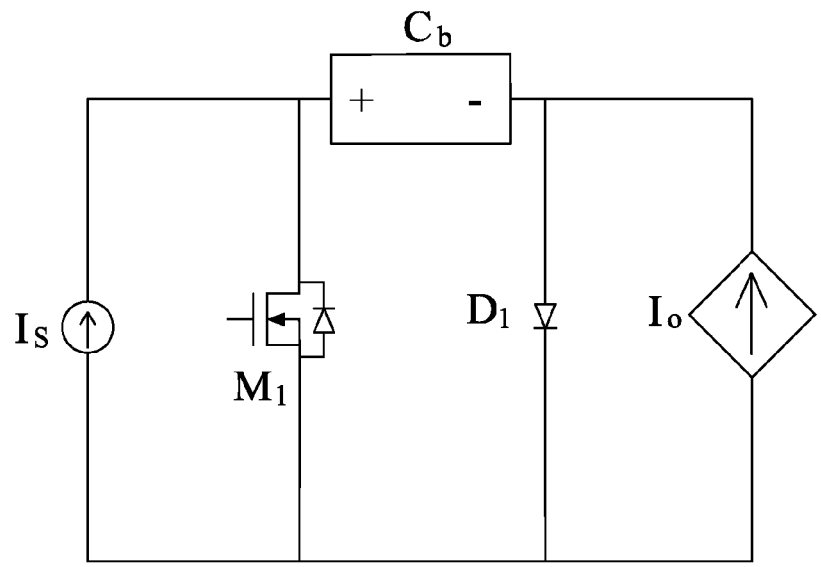
FIG. 8D is a circuit diagram equivalent to the Cuk converter shown in FIG. 4D.
Figure 8E:
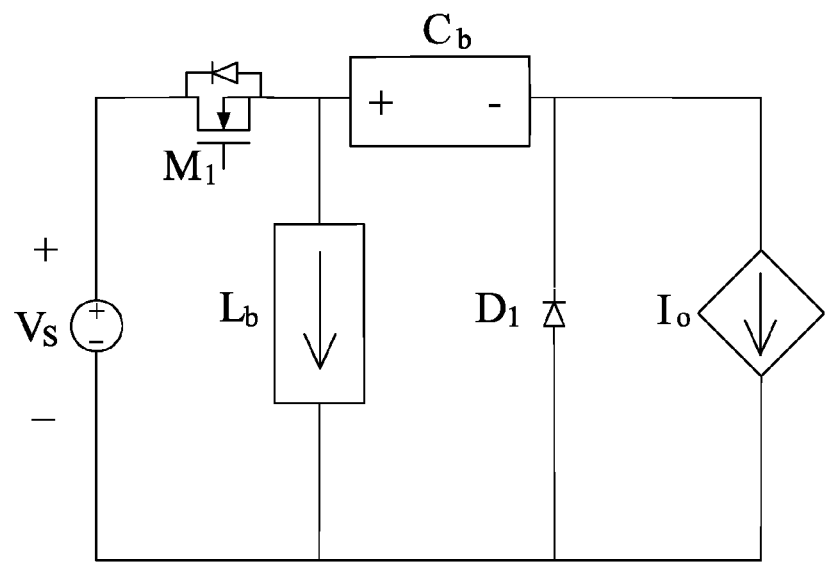
FIG. 8E is a circuit diagram equivalent to the Zeta converter shown in FIG. 4E.
Figure 8F:
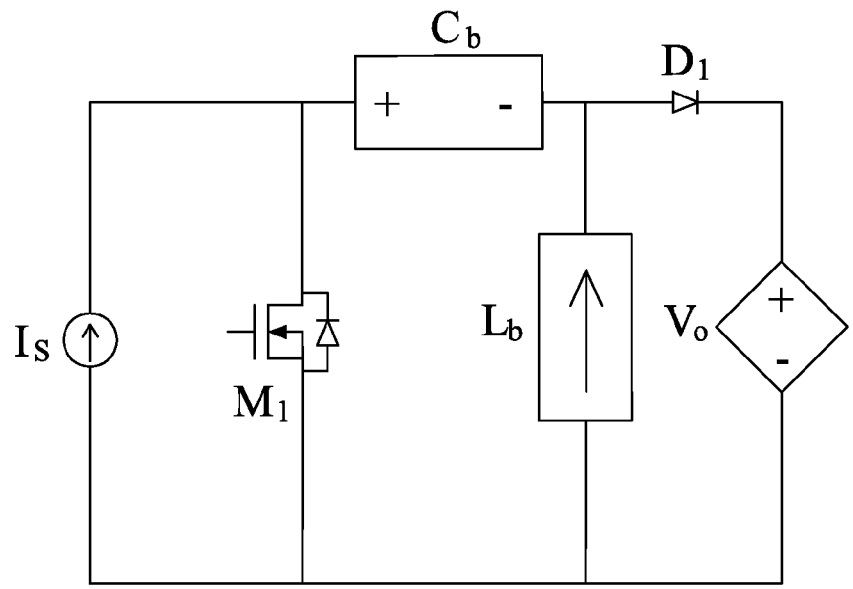
FIG. 8F is a circuit diagram equivalent to the Sepic converter shown in FIG. 4F.

If the six basic non-isolation converters, the Buck, Boost, Buck-Boost, Cuk, Zeta, and Sepic converters, shown in FIGS. 4A to 4F, are simplified according to the preceding categorized conditions of the voltage type and current type and FIGS. 5A, 5B, 6A, 6B, 7A and 7B, the equivalent circuits as shown in FIGS. 8A and 8F can be obtained.

Figure 4A:
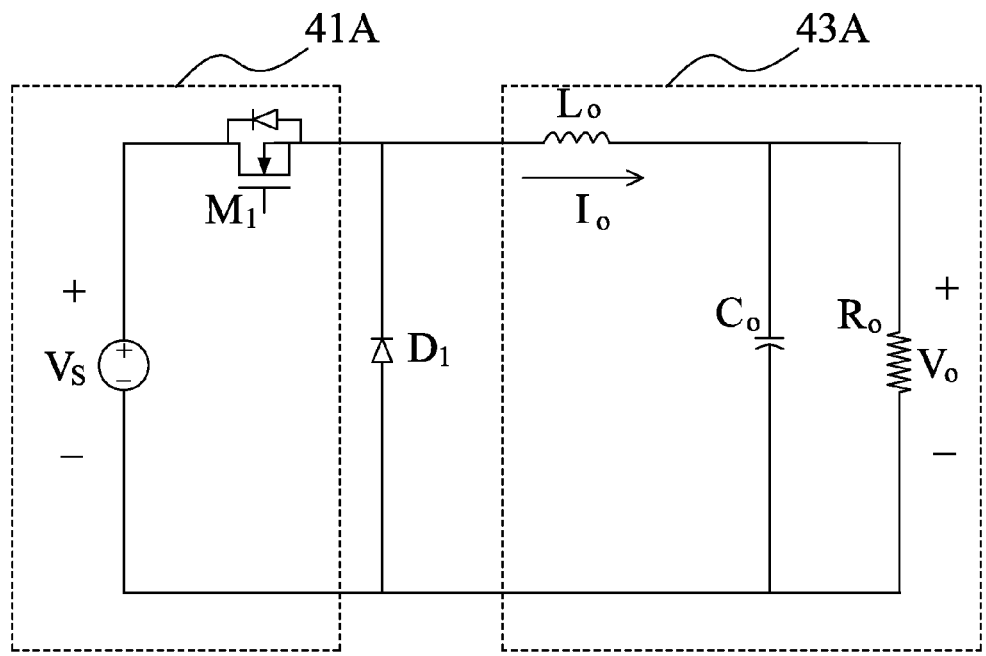
FIG. 4A is a circuit diagram illustrating the conventional Buck converter.
Figure 5A:
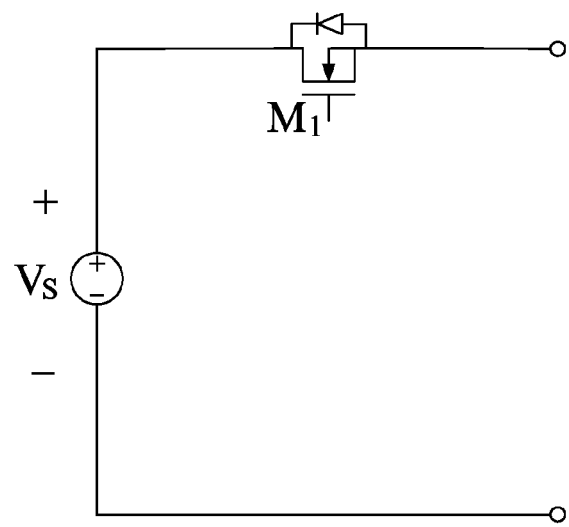
FIG. 5A is a circuit diagram illustrating a voltage type input unit of the basic converter.
Figure 5B:
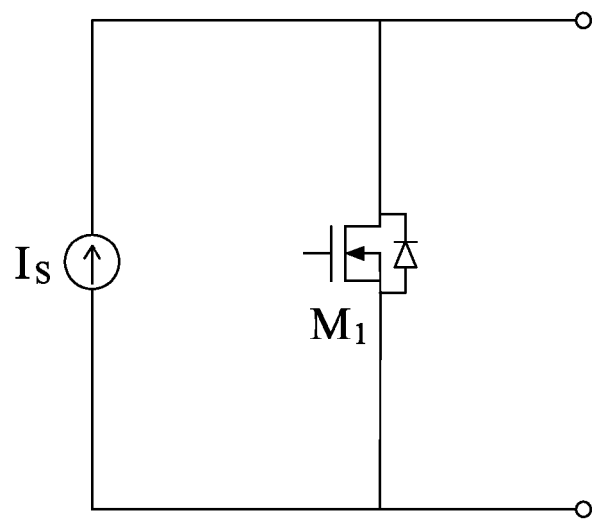
FIG. 5B is a circuit diagram illustrating a current type input unit of the basic converter.

For instance, the input unit 41A of the Buck converter shown in FIG. 4A is a power source $V_S$ serially connecting with a switch $M_1$, and it can be categorized as the voltage type input unit. Further, there is no energy buffer unit in the Buck converter and the output unit 43A is a capacitor $C_O$ parallelly connecting with the load resistor $R_O$ and then serially connecting with an inductor $L_O$ and it can be categorized as the current type output unit such that the Buck converter shown in FIG. 8A can be categorized as a converter with the voltage type input and the current type output.

Figure 4B:
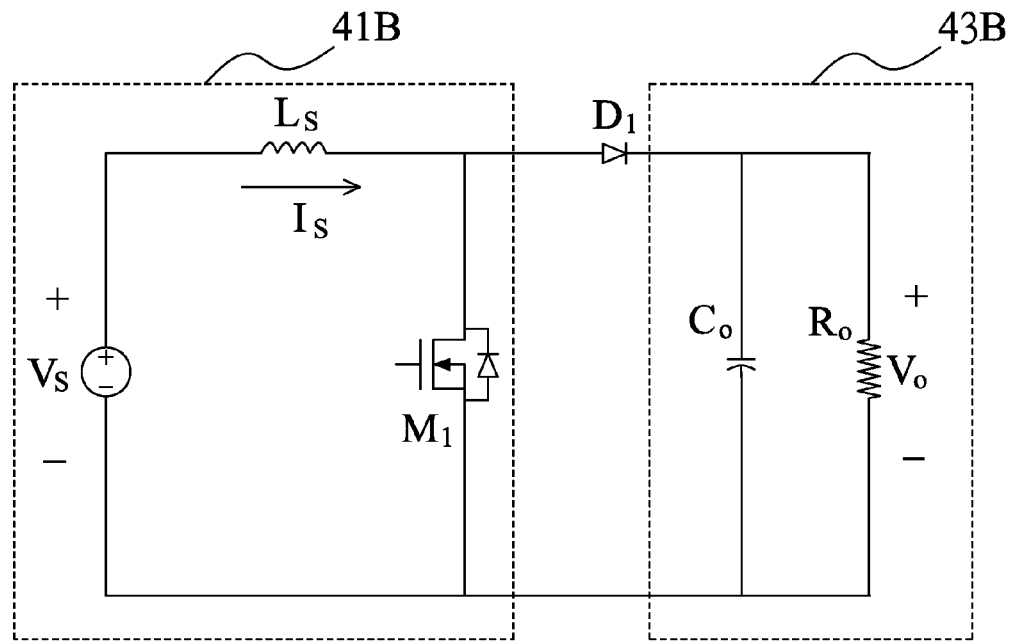
FIG. 4B is a circuit diagram illustrating the conventional Boost converter.

There is no energy buffer unit in the circuit of the Boost converter shown in FIG. 4B, and only the input unit 41B and the output unit 43B are provided. The input unit 41B is a power source $V_S$ serially connecting with an inductor $L_S$ and then parallelly connecting with a switch $M_1$, that is, it can be regarded as the current source parallelly connecting with the switch $M_1$ such that it can be categorized as the current type input unit. The output unit 43B is a capacitor $C_O$ parallelly connecting with the load resistor $R_O$ such that it can be categorized as the voltage type output unit 43B. Hence, the Boost converter shown in FIG. 8B can be categorized as the converter with the current type input and the voltage type output.

Figure 4C:
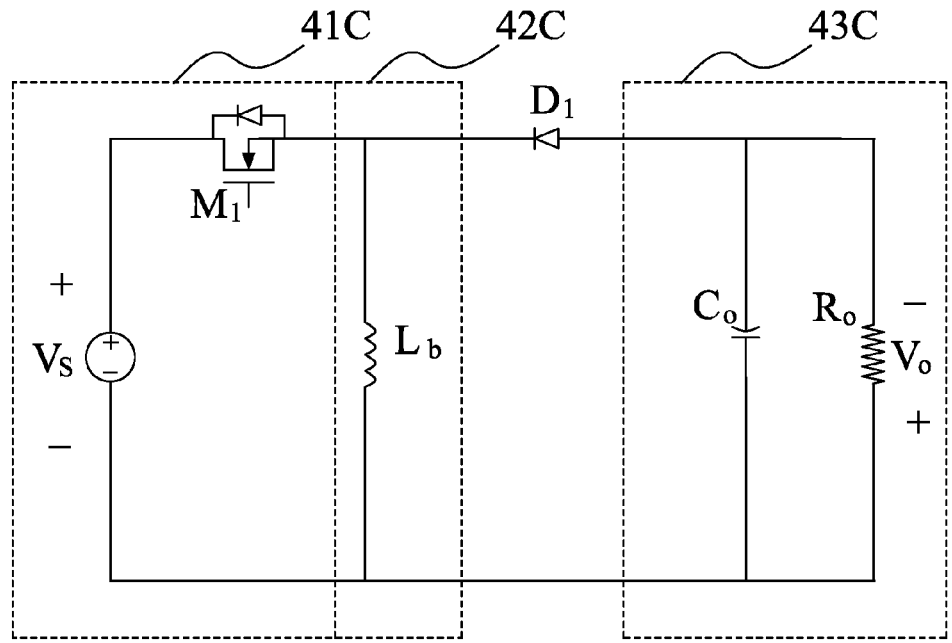
FIG. 4C is a circuit diagram illustrating the conventional Buck-boost converter.
Figure 4D:
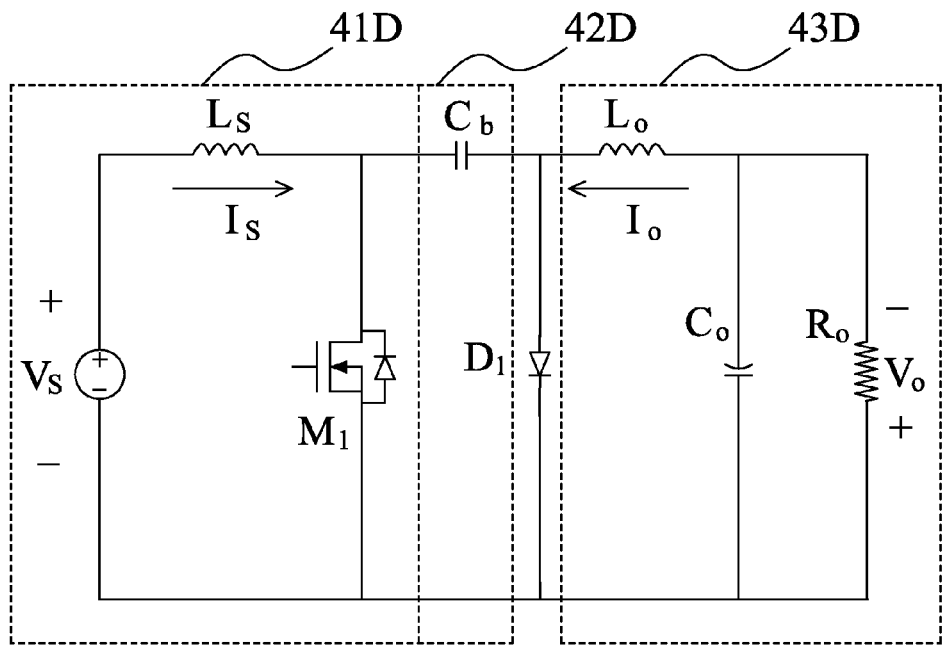
FIG. 4D is a circuit diagram illustrating the conventional Cuk converter.
Figure 4E:
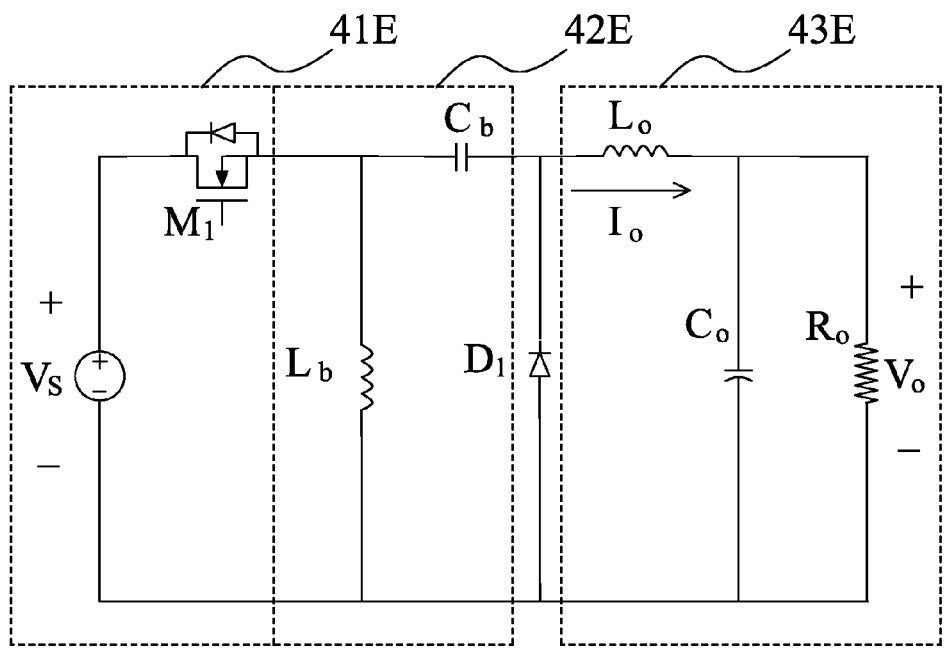
FIG. 4E is a circuit diagram illustrating the conventional Zeta converter.
Figure 4F:
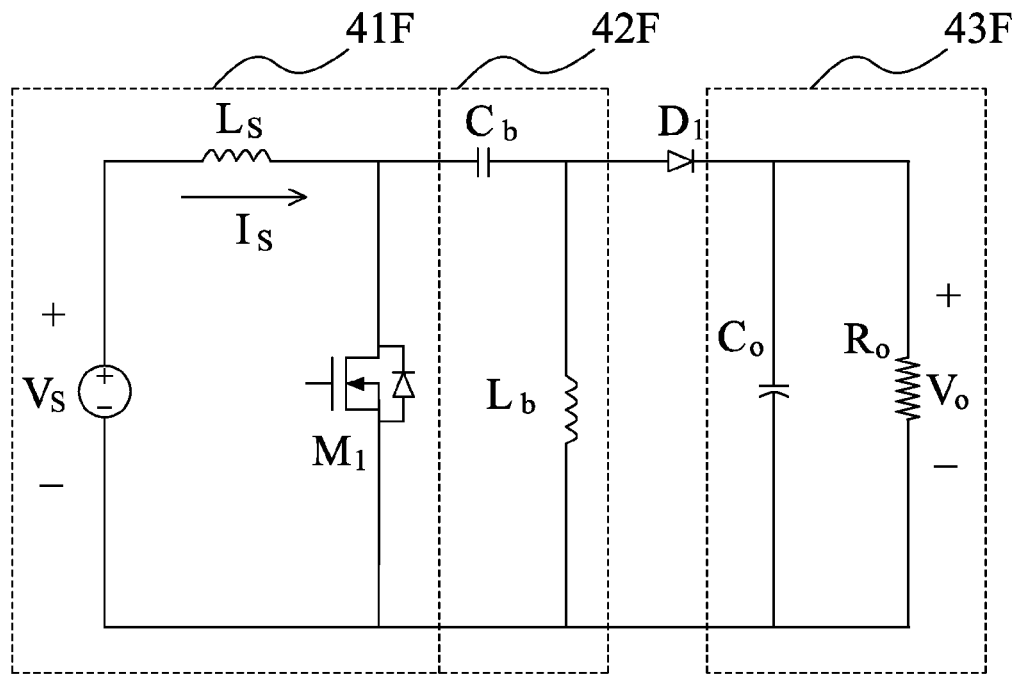
FIG. 4F is a circuit diagram illustrating the conventional Sepic converter.

Similarly, The Buck-boost converter shown in FIG. 4C is categorized as the converter with the voltage type input and the voltage type output as shown in FIG. 8C; the Cuk converter shown in FIG. 4D is categorized as the converter with the current type input and the current type output as shown in FIG. 8D; the Zeta converter as shown in FIG. 4E is categorized as the converter with the voltage type input and the current type output; the Sepic converter as shown in FIG. 4F is categorized as the converter with the current type input and the voltage type output.

According to the preceding categorized results, anyone of the selectable circuit structure combinations in table 1 with corresponding input type and output type can be simplified as the single stage circuit. The principle for simplification is that the selected converter is instead of the synchronous rectifying circuit first, that is, the diode of the passive element in the converter circuit is changed to a switch, which operates in a complimentary mode with the main switch in the converter. Besides, because the charging converter circuit and the discharging converter circuit of the stand-alone solar energy power generation system are operated under the complimentary mode, the simplified single stage circuit has to be added with a low speed or high speed switch serially connected to the load.

Figure 9:
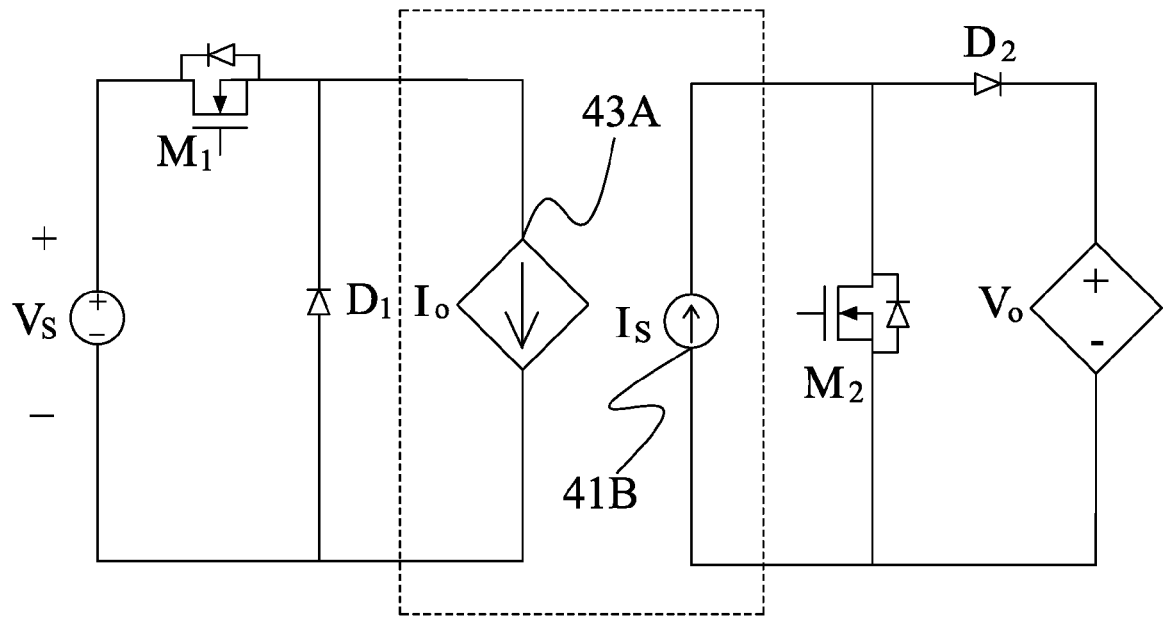
FIG. 9 is a circuit diagram illustrating the front stage charging converter being the Buck converter and the back stage discharging converter being the Boost converter.

Next, according to the categorization and the corresponding relation for the input and output of the selected converter, the two-stage circuit can be simplified as the single stage circuit. For the example as shown in FIG. 9, when the selected front stage charging converter circuit is the Buck converter shown in FIG. 4A, and the selected back stage discharging converter is the Boost converter as shown in FIG. 4B, the current type element and the switch of the front and back stages can be commonly used due to the output unit 43A of the Buck converter being the current type, and the input unit 41B of the Boost converter also being the current type such that it is capable of achieving the purpose of simplifying the circuit.

Figure 10:
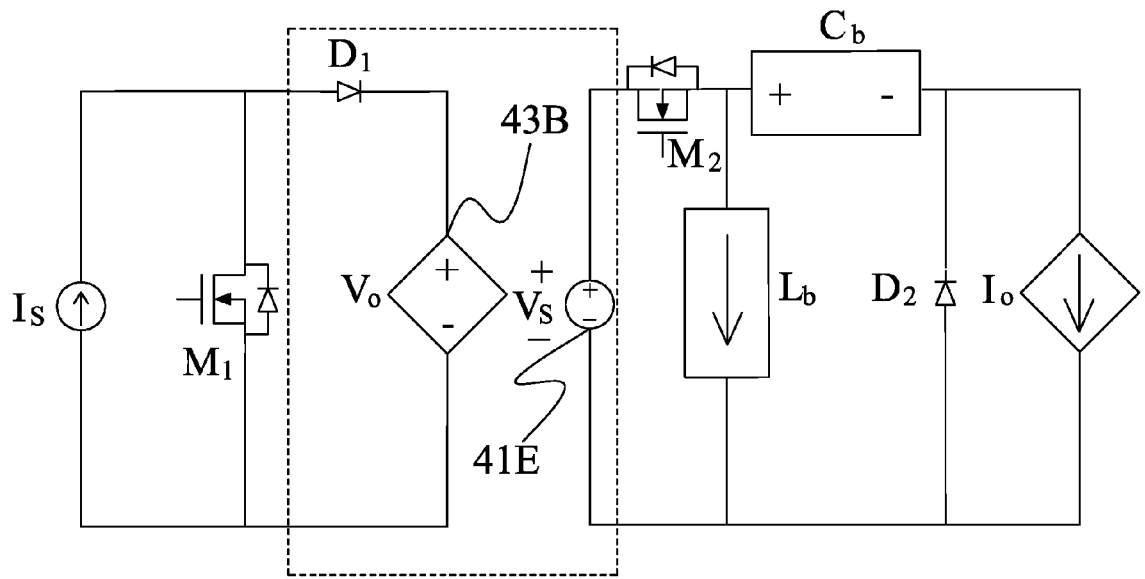
FIG. 10 is a circuit diagram illustrating the front stage charging converter being the Boost converter and the back stage discharging converter being the Zeta converter.

Further, referring to FIG. 10, when the selected front stage charging converter circuit is the Boost converter shown in FIG. 4B, and the selected back stage discharging converter is the Zeta converter as shown in FIG. 4E, the voltage type element and the switch of the front and back stages can be commonly used due to the output unit 43B of the Boost converter being the voltage type, and the input unit 41E of the Zeta converter also being the voltage type such that it is capable of achieving the purpose of simplifying the circuit.

According to the preceding simplification principle, selectable circuit structure combinations in table 1 can be rearranged in the following table 2 to table 5 based the corresponding relation of the input and the output.

TABLE 2: is the simplification combinations of circuit structure for $V_{PV} > V_B$ and $V_B > V_O$

| Charger | Discharger | | | | |
|---|---|---|---|---|---|
| | Buck | Buck-boost | Zeta | Cuk | Sepic |
| Buck | Δ | Δ | Δ | ○ | ○ |
| Buck-boost | ○ | ⊚ | ○ | Δ | Δ |
| Zeta | Δ | Δ | Δ | ○ | ⊚ |
| Cuk | Δ | Δ | Δ | ○ | ○ |
| Sepic | ○ | ○ | ⊚ | Δ | Δ |

TABLE 3: The simplification combinations of circuit structure for $V_{PV} > V_B$ and $V_B < V_O$

| Charger | Discharger | | | | |
|---|---|---|---|---|---|
| | Boost | Buck-boost | Zeta | Cuk | Sepic |
| Buck | ⊚ | Δ | Δ | ○ | ○ |
| Buck-boost | ○ | ⊚ | ○ | Δ | Δ |
| Zeta | ○ | Δ | Δ | ○ | ⊚ |
| Cuk | ○ | Δ | Δ | ○ | ○ |
| Sepic | Δ | ○ | ⊚ | Δ | Δ |

TABLE 4: The simplification combinations of circuit structure for $V_{PV} < V_B$ and $V_B > V_O$

| Charger | Discharger | | | | |
|---|---|---|---|---|---|
| | Buck | Buck-boost | Zeta | Cuk | Sepic |
| Boost | ⊚ | ○ | ○ | Δ | Δ |
| Buck-boost | ○ | ⊚ | ⊚ | Δ | Δ |
| Zeta | Δ | Δ | Δ | ○ | ⊚ |
| Cuk | Δ | Δ | Δ | ○ | ○ |
| Sepic | ○ | ○ | ⊚ | Δ | Δ |

TABLE 5: The simplification combinations of circuit structure for $V_{PV} < V_B$ and $V_B < V_O$

| Charger | Discharger | | | | |
|---|---|---|---|---|---|
| | Boost | Buck-boost | Zeta | Cuk | Sepic |
| Boost | Δ | ○ | ○ | Δ | Δ |
| Buck-boost | Δ | ⊚ | ○ | Δ | Δ |
| Zeta | ○ | Δ | Δ | ○ | ⊚ |
| Cuk | ○ | Δ | Δ | ○ | ○ |
| Sepic | Δ | ○ | ⊚ | Δ | Δ |

In tables 2 to 5, the symbols Δ, ○ and ⊚ stand for the circuit structure combinations of being unsuitable to be simplified, suitable to be simplified and best suitable to be simplified, respectively, according to the corresponding relation of the input and the output of the equivalent circuits shown in FIGS. 8A to 8F.

For instance, the relation of the input to the output for the front and the back stage circuits of the combination for the Buck and Buck circuits in Table 2 is the current type to the voltage type such that it is the circuit structure combination unsuitable to be simplified due to that the input of the front stage is not corresponding to the output of the back stage and the output of the front stage is not corresponding to the input of the back stage either. The relation of the input to the output for the front and the back stage circuits of the combination for the Buck-Boost and the Buck circuits in Table 2 is the voltage type to the voltage type and the voltage type to the current type respectively such that it is the circuit structure combination suitable to be simplified due to that the circuit elements of the voltage type circuit connecting with each other can be commonly shared. Besides, there are still some portions which can not be simplified due to that the input of the Buck-Boost circuit is the voltage type and the output of the Buck circuit is the current type, so it is not a completely simplified circuit structure combination. The relation of the input to the output for the front and the back stage circuits of the combination for the Buck-Boost and the Buck-Boost circuits in Table 2 is the voltage type to the voltage type such that the two circuits can be simplified to the simplest combination of circuit structure. The combination of the Buck-Boost and Buck-Boost circuits and the combination of the Zeta and Sepic circuits are taken as examples to explain the consequence of the circuit structure of the two-stage stand-alone solar energy power generating system after being simplified in the following paragraphs.

Figure 11A:
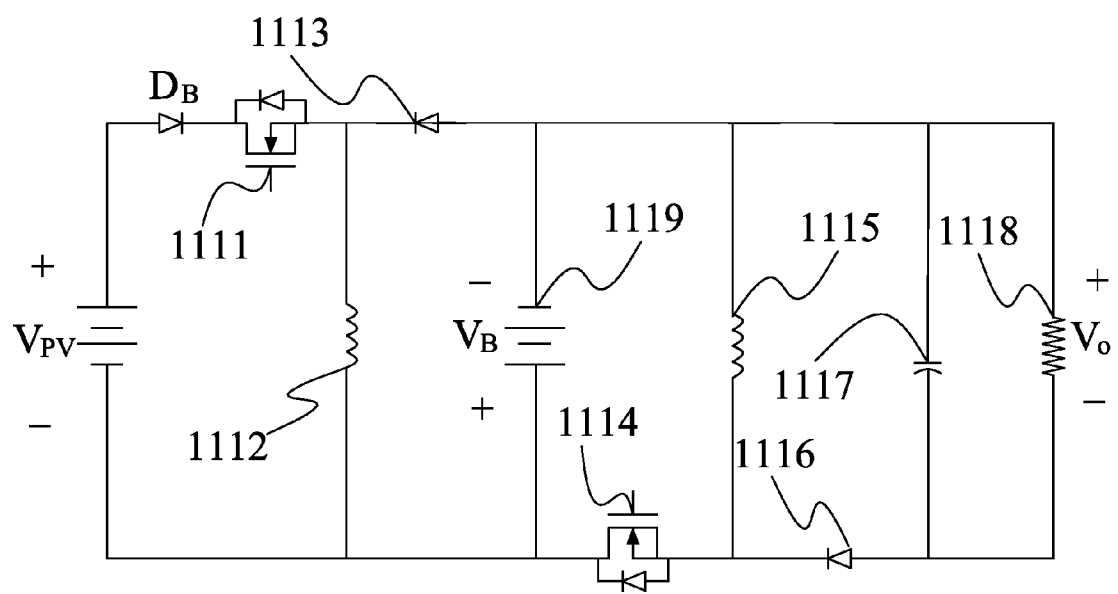
FIG. 11A is a circuit diagram illustrating the Buck-boost converter being the charging converter and the discharging converter of the two-stage low boost-buck ratio stand-alone solar energy power generating system respectively.
Figure 11B:
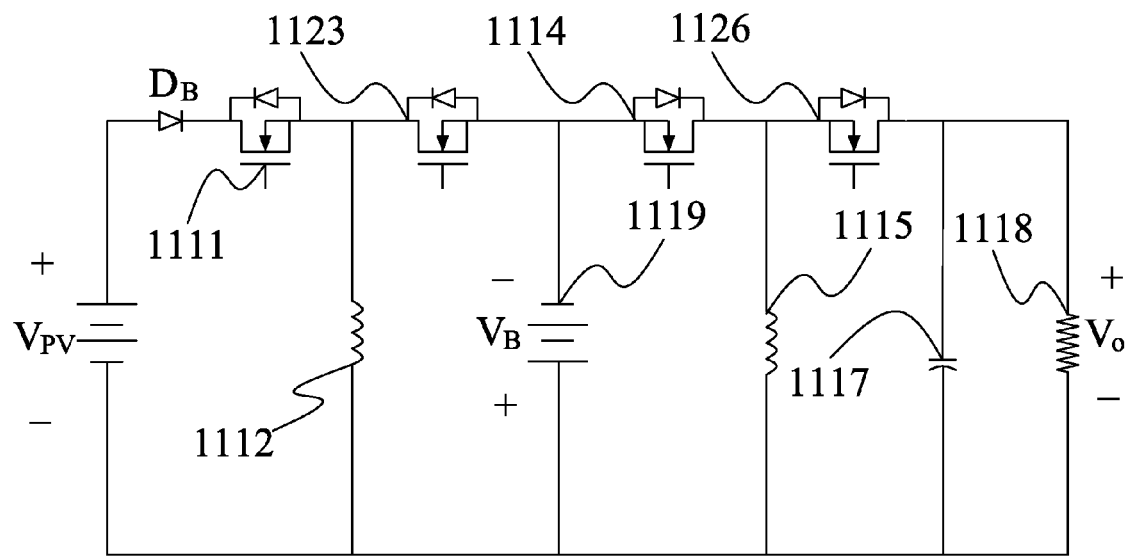
FIG. 11B is a circuit diagram illustrating the Buck-boost converter in the two-stage low boost-buck ratio stand-alone solar energy power generating system shown in FIG. 11A being changed to a synchronous rectifying circuit instead.
Figure 11C:
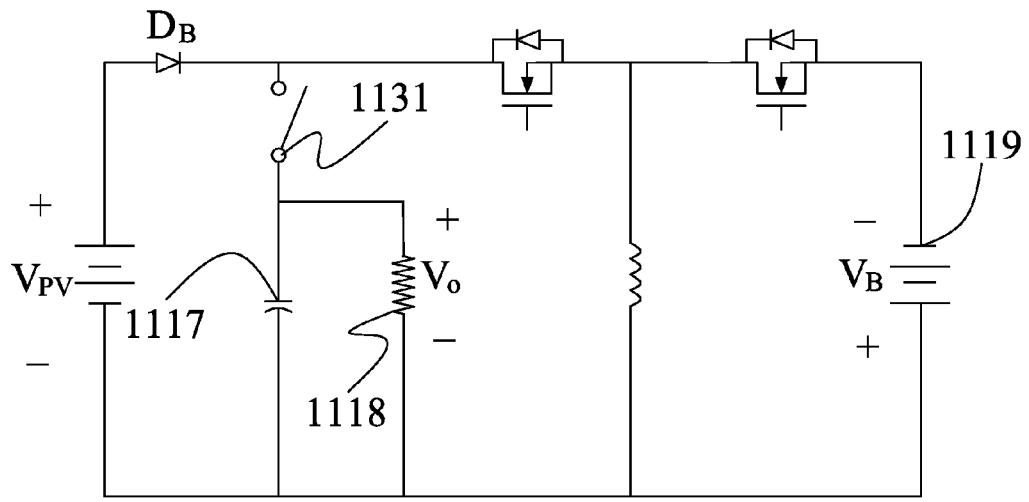
FIG. 11C is a circuit diagram illustrating a single stage low boost-buck ratio stand-alone solar energy power generating system simplified from the circuit shown in FIG. 11B.

Please Referring to FIGS. 11A to 11C, the Buck-Boost converter is selected as the charging converter circuit and the discharging converter circuit respectively for the two-stage type low boost/buck ratio stand-alone solar energy power generating system. According to the preceding simplification principle, firstly, the Buck-boost converters shown in FIG. 11A are changed to the synchronous rectified Buck-Boost converters instead, that is, the diodes 1113, 1116 of the passive elements in the circuit are changed to switches 1123, 1126, and then the positions of the switches 1114, 1126 are adjusted slightly as shown in FIG. 11B.

It can be seen in FIG. 11B that the elements of the adjusted charging converter circuit and discharging converter circuit, which are disposed at the left and right, have been in a state of symmetry to each other such that the charging converter circuit and the discharging converter circuit are folded in halves with respect to the battery 1119 to allow the switches 1114, 1126, and the inductor 1115 to overlap with the switches 1123, 1111, and the inductor 1112 for being commonly used respectively. In addition, in order to be operated normally with the charging mode or the discharging mode for the simplified single stage low boost/buck ratio stand-alone solar energy power generating system, the connecting node between the load resistor 1118 and the capacitor 1117 is inserted with a low speed or high speed switch 1131 to control the operation mode. In this way, the simplified single stage low boost/buck ratio stand-alone solar energy power generating system is completed as shown in FIG. 11C.

Figure 12A:
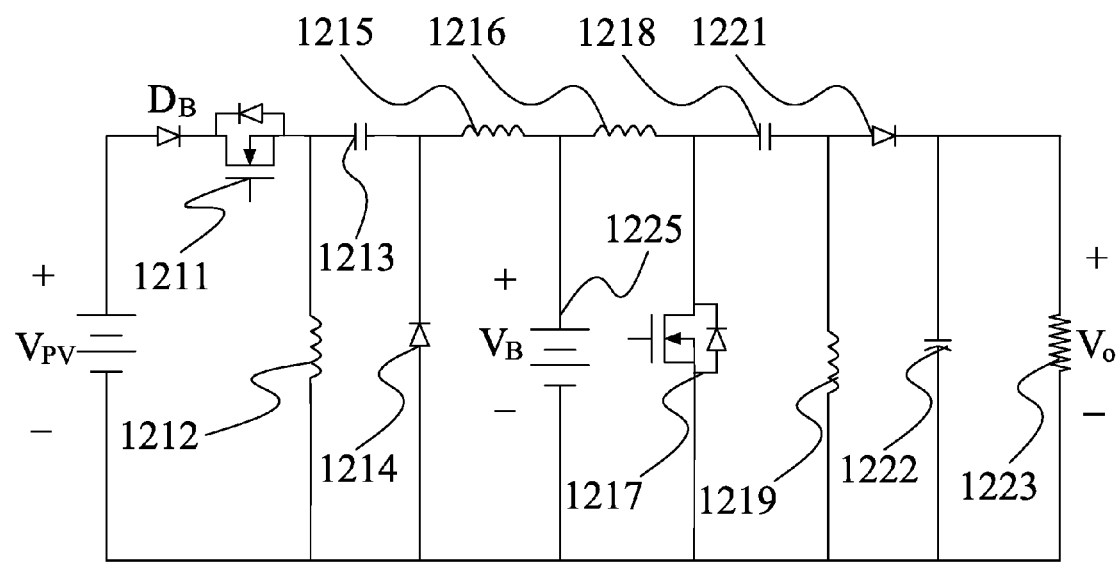
FIG. 12A is a circuit diagram illustrating the Zeta converter being the charging converter and the Sepic converter being the discharging converter of the two-stage low boost-buck ratio stand-alone solar energy power generating system respectively.
Figure 12B:
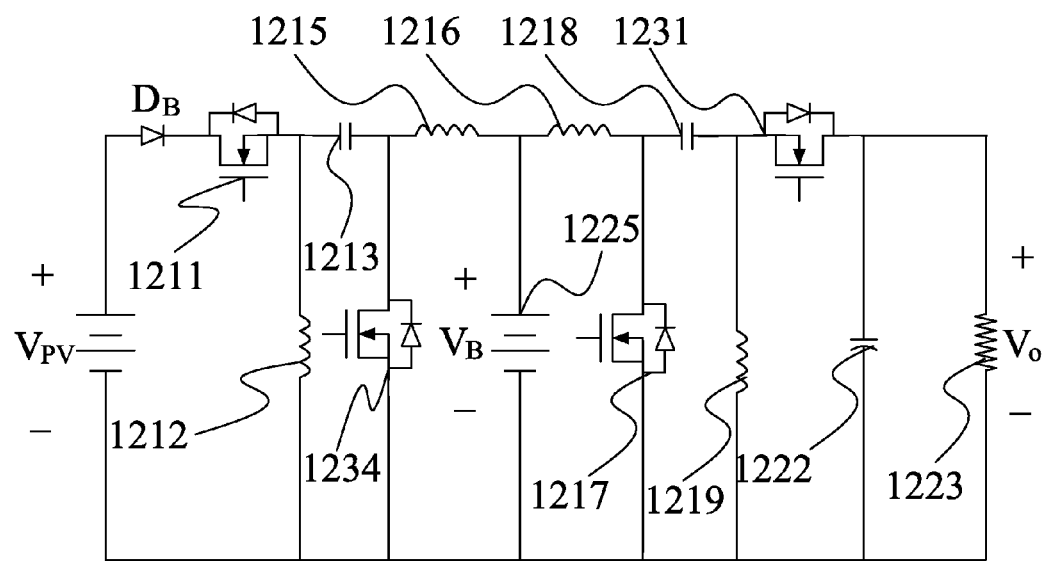
FIG. 12B is a circuit diagram illustrating the Zeta and Sepic converters in the two-stage low boost-buck ratio stand-alone solar energy power generating system shown in FIG. 12A being changed to the synchronous rectifying circuit instead.
Figure 12C:
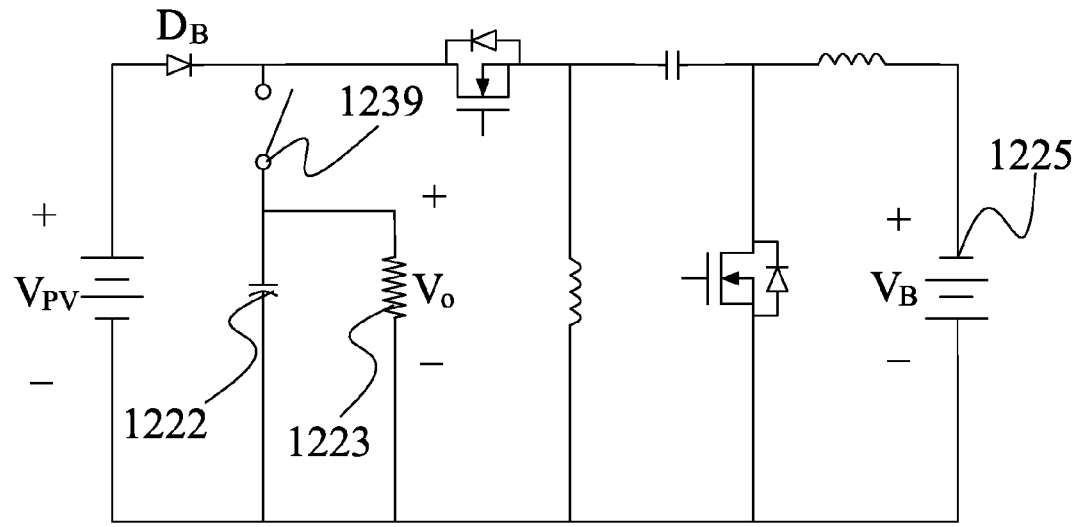
FIG. 12C is a circuit diagram illustrating a single stage low boost-buck ratio stand-alone solar energy power generating system simplified from the circuit shown in FIG. 12B.

Please Referring to FIGS. 12A to 12C, the Zeta converter is selected as the charging converter circuit, and the Sepic converter is selected as the discharging converter circuit for the two-stage type low boost/buck ratio stand-alone solar energy power generating system. Firstly, the Zeta and the Sepic converters shown in FIG. 12A are changed to the synchronous rectified Zeta and Sepic converters instead, that is, the diodes 1214, 1221 of the passive elements in the circuit are changed to switches 1234, 1231 as shown in FIG. 12B.

It can be seen in FIG. 12B that the elements of the changed charging converter circuit and discharging converter circuit, which are disposed at the right and left respectively, have been in a state of symmetry to each other such that the charging converter circuit and the discharging converter circuit are folded in halves with respect to the battery 1225 to allow the switches 1211, 1234, the inductors 1212, 1215, and the capacitor 1213 to overlap with the switches 1231, 1217, the inductors 1219, 1216, and the capacitor 1218 for being commonly used respectively. Further, the connecting node between the simplified load resistor 1223 and capacitor 1222 is inserted with a low speed or high speed switch 1239 to control the operation for the charging mode and discharging mode. In this way, the simplified single stage low boost/buck ratio stand-alone solar energy power generating system is completed as shown in FIG. 12C.

Figure 13A:
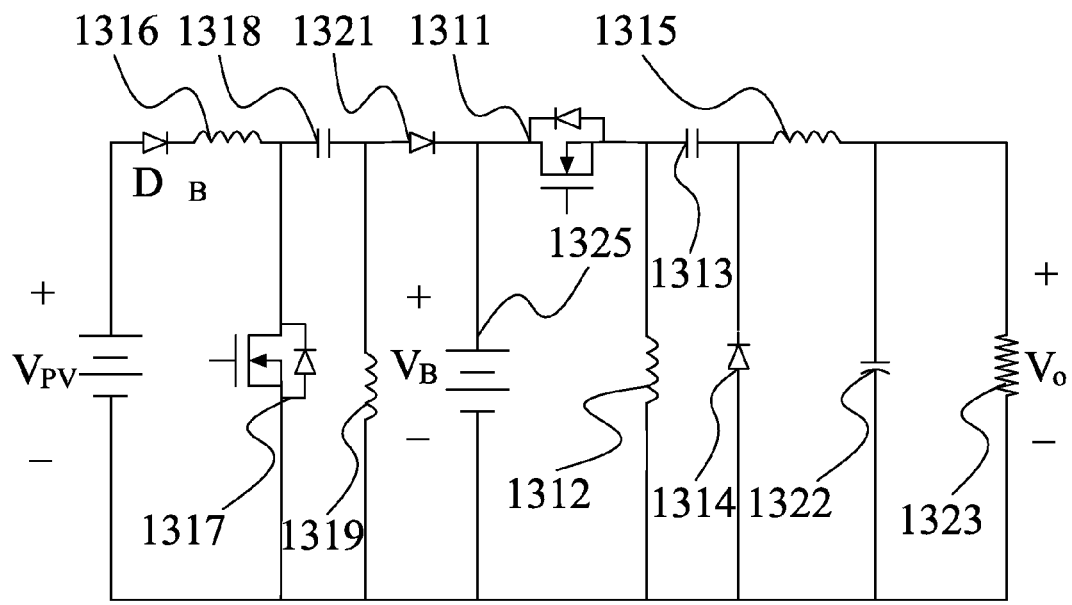
FIG. 13A is a circuit diagram illustrating the Sepic converter being the charging converter and the Zeta converter being the discharging converter of the two-stage low boost-buck ratio stand-alone solar energy power generating system respectively.
Figure 13B:
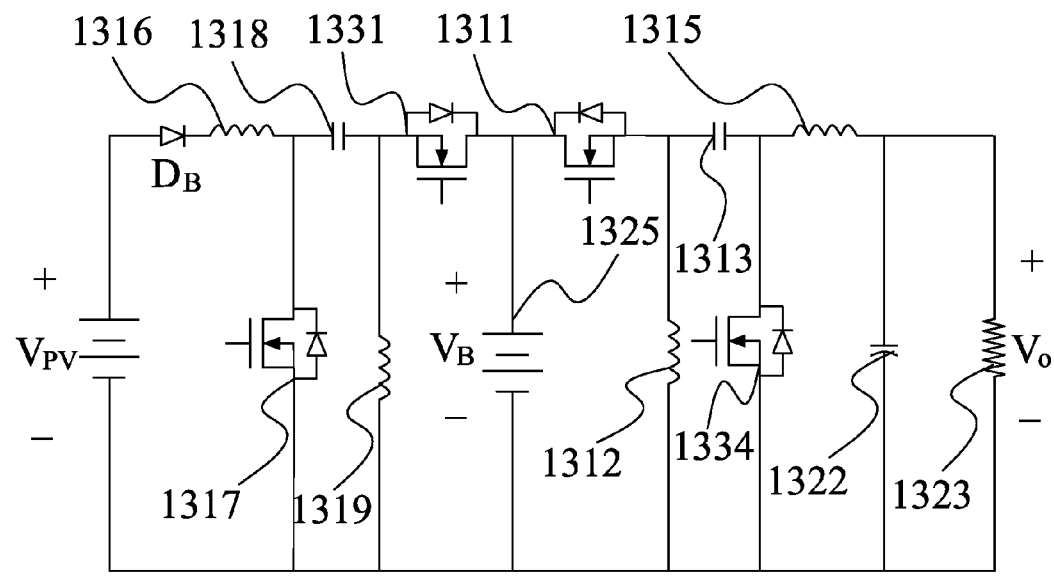
FIG. 13B is a circuit diagram illustrating the Zeta and Sepic converters in the two-stage low boost-buck ratio stand-alone solar energy power generating system shown in FIG. 13A being changed to the synchronous rectifying circuit instead.
Figure 13C:
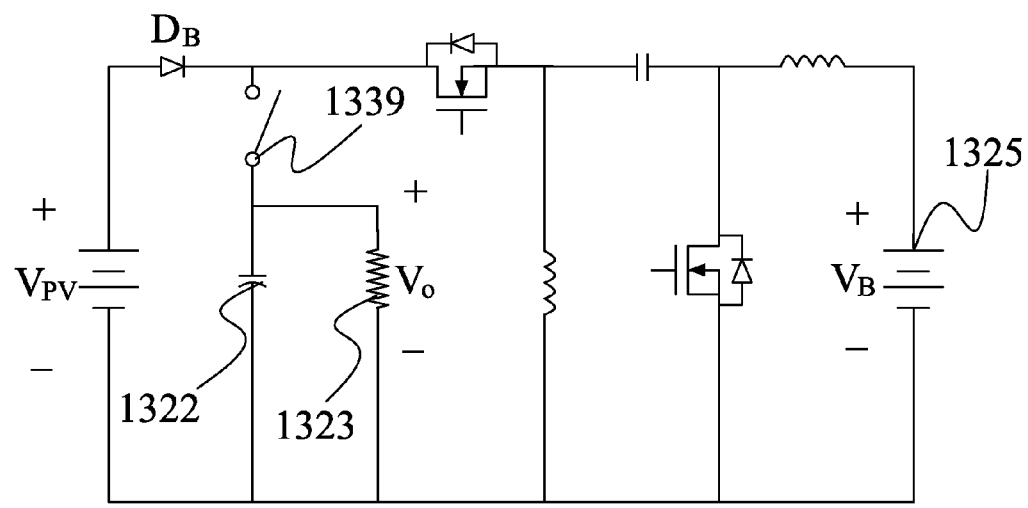
FIG. 13C is a circuit diagram illustrating a single stage low boost-buck ratio stand-alone solar energy power generating system simplified from the circuit shown in FIG. 13B.

Please Referring to FIGS. 13A to 13C, the Sepic converter is selected as the charging converter circuit, and the Zeta converter is selected as the discharging converter circuit for the two-stage type low boost/buck ratio stand-alone solar energy power generating system. Firstly, the Zeta and the Sepic converters shown in FIG. 13A are changed to the synchronous rectified Zeta and Sepic converters instead, that is the diodes 1314, 1321 of the passive elements in the circuit are changed to switches 1334, 1331 as shown in FIG. 13B.

It can be seen in FIG. 13B that the elements of the changed charging converter circuit and discharging converter circuit, which are disposed at the right and left respectively, have been in a state of symmetry to each other such that the charging converter circuit and the discharging converter circuit are folded in halves with respect to the battery 1225 to allow the switches 1311, 1334, the inductors 1312, 1315, and the capacitor 1313 to overlap with the switches 1331, 1317, the inductors 1319, 1316, and the capacitor 1318 for being commonly used respectively. Further, the connecting node between the simplified load resistor 1323 and capacitor 1322 is inserted with a low speed or high speed switch 1339 to control the operations of the charging mode and discharging mode. In this way, the simplified single stage low boost/buck ratio stand-alone solar energy power generating system is completed as shown in FIG. 13C.

While the invention has been described with referencing to a preferred embodiment thereof, it is to be understood that modifications or variations may be easily made without departing from the spirit of this invention, which is defined by the appended claims.

What is claimed is:

1. A single stage low boost/buck ratio stand-alone solar energy power generating circuit, which is suitable for storing a power generated from a solar energy power generating unit and supplying said power to a load unit, comprising:
   a storage unit;
   a plurality of elements joining with the storage unit to act as a charging converter for storing said power generated from said solar energy power generating unit in said storage unit and a discharging converter for supplying the power stored in said storage unit to said load unit;
   wherein the charging and discharging converters are synchronous rectifying Buck-Boost converters respectively;
   wherein some of the elements are commonly owned by the two converters, and the two converters share the commonly owned elements.

2. A single stage low boost/buck ratio stand-alone solar energy power generating circuit, which is suitable for storing a power generated from a solar energy power generating unit and supplying said power to a load unit, comprising:
   a storage unit;
   a plurality of elements joining with the storage unit to act as a charging converter for storing said power generated from said solar energy power generating unit in said storage unit and a discharging converter for supplying the power stored in said storage unit to said load unit;

wherein said charging and discharging converters are a synchronous rectifying Zeta converter and a synchronous rectifying Sepic converter;

wherein some of the elements are commonly owned by the two converters, and the two converters share the commonly owned elements.

3. A single stage low boost/buck ratio stand-alone solar energy power generating system comprising:

a solar energy power generating unit for generating a power;

a load unit;

an energy storage unit;

a plurality of elements joining with the preceding units to act as a charging converter for storing the power generated from said solar energy power generating unit in said storage unit and a discharging converter for supplying the power stored in said storage unit to said load unit;

wherein said charging and discharging converters are synchronous rectifying Buck-Boost converters respectively;

wherein some of the elements are commonly owned by the two converters, and the two converters share the commonly owned elements.

4. A single stage low boost/buck ratio stand-alone solar energy power generating system comprising:

a solar energy power generating unit for generating a power;

a load unit;

an energy storage unit;

a plurality of elements joining with the preceding units to act as a charging converter for storing the power generated from said solar energy power generating unit in said storage unit and a discharging converter for supplying the power stored in said storage unit to said load unit;

wherein said charging and discharging converters are a synchronous rectifying Zeta converter and a synchronous rectifying Sepic converter;

wherein some of the elements are commonly owned by the two converters, and the two converters share the commonly owned elements.

5. The single stage low boost/buck ratio stand-alone solar energy power generating system as defined in claim 3, wherein said load unit further comprises a load and a switch serially connecting with said load.

6. The single stage low boost/buck ratio stand-alone solar energy power generating system as defined in claim 4, wherein said load unit further comprises a load and a switch serially connecting with said load.

* * * * *

UNITED STATES PATENT AND TRADEMARK OFFICE
CERTIFICATE OF CORRECTION

| | | |
|---|---|---|
| PATENT NO. | : 8,541,973 B2 | Page 1 of 1 |
| APPLICATION NO. | : 12/623433 | |
| DATED | : September 24, 2013 | |
| INVENTOR(S) | : Sheng-Yu Tseng, Ying-Jhih Wu and Kuo-Chi Liu | |

It is certified that error appears in the above-identified patent and that said Letters Patent is hereby corrected as shown below:

Title Page, item (75), line 3, the third inventor's name should read: Kuo-Chi Liu Signed and Sealed this
Eighteenth Day of February, 2014

Michelle K. Lee
*Deputy Director of the United States Patent and Trademark Office*